(No Model.)  3 Sheets—Sheet 1.

L. A. ENZINGER.
FILTER PLATE.

No. 550,955.  Patented Dec. 10, 1895.

Witnesses:
Harry J. Rohrer
Geo. E. Cruse

Inventor:
L. A. Enzinger
By Knight Bros.
Attys.

(No Model.)  
L. A. ENZINGER.  
FILTER PLATE.  
3 Sheets—Sheet 2.
No. 550,955. Patented Dec. 10, 1895.
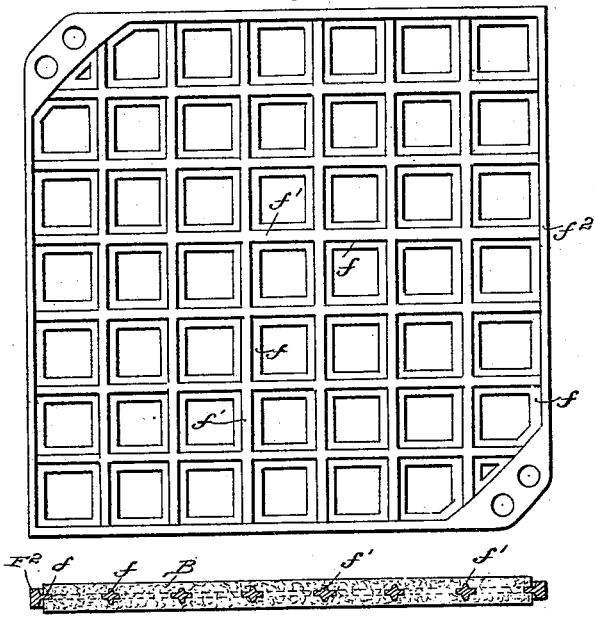
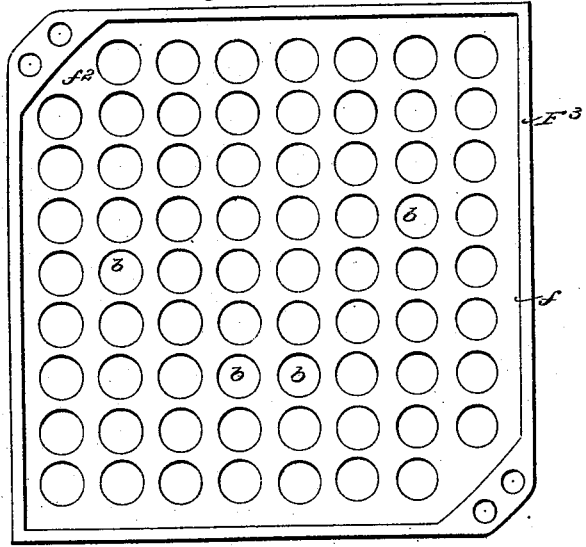
Witnesses:  
Harry D. Rohrer  
Geo. E. Cruse  
Inventor:  
L. A. Enzinger  
By Knight Bro.  
Attys.

(No Model.) 3 Sheets—Sheet 3.
L. A. ENZINGER.
FILTER PLATE.
No. 550,955. Patented Dec. 10, 1895.
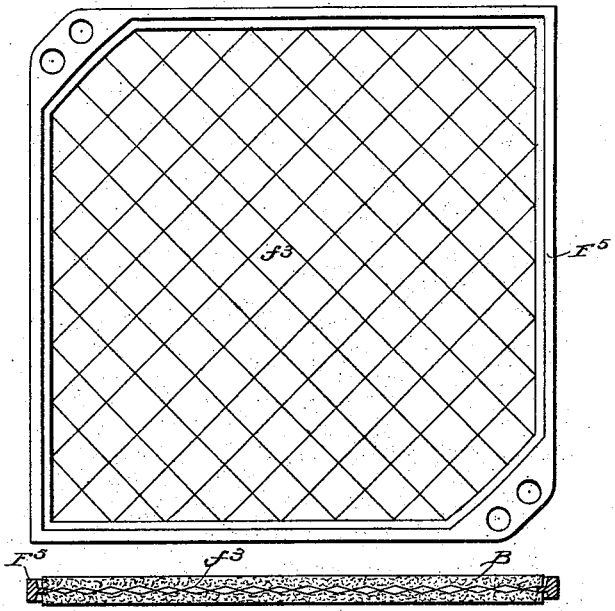
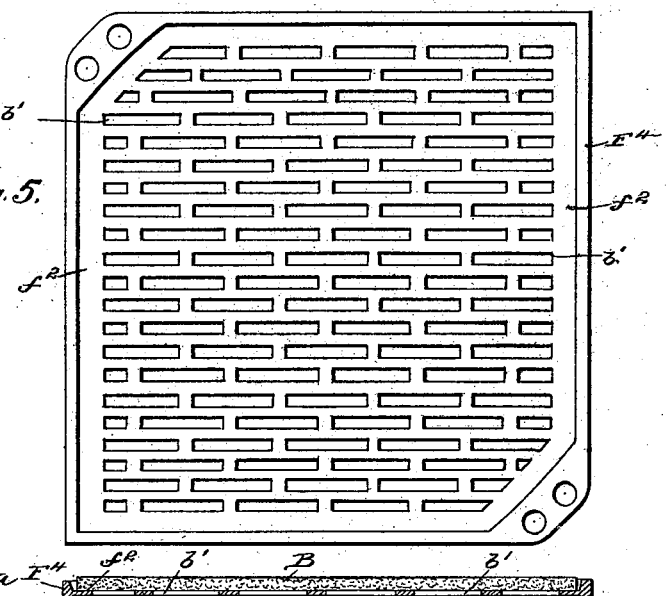
Witnesses: Inventor:
L. A. Enzinger.
By Knight Bros.
Attys.

UNITED STATES PATENT OFFICE.

LORENZ ADALBERT ENZINGER, OF WORMS, GERMANY.

FILTER-PLATE.

SPECIFICATION forming part of Letters Patent No. 550,955, dated December 10, 1895.

Application filed July 18, 1893. Serial No. 481,242. (No model.) Patented in Belgium May 31, 1892, No. 99,716; in Italy June 6, 1892, LXII, 437; in France September 20, 1892, No. 221,221; in Norway October 5, 1892, No. 2,728; in Austria-Hungary October 21, 1892, No. 14,934 and No. 49,807; in Luxemburg January 6, 1893, No. 1,745, and in Switzerland January 31, 1893, No. 5,470.

*To all whom it may concern:*

Be it known that I, LORENZ ADALBERT ENZINGER, a subject of the Grand Duke of Hesse, residing at Worms, in the Grand Duchy of Hesse, German Empire, have invented a new and useful Filtering-Plate, (for which I have obtained patents in France, No. 221,221, bearing date September 20, 1892; in Belgium, No. 99,716, bearing date May 31, 1892; in Italy, No. 437, Vol. LXII, bearing date June 6, 1892; in Norway, No. 2,728, bearing date October 5, 1892; in Austria-Hungary, No. 14,934 and No. 49,807, bearing date October 21, 1892; in Luxemburg, No. 1,745, bearing date January 6, 1893, and in Switzerland, No. 5,470, bearing date January 31, 1893,) of which the following is a specification.

My invention relates to filter-plates to be used in filter-presses, such as covered by my patent numbered 393,633.

My improved filter-plates are composed of a frame having one or more compartments, each of which is provided on the inside with a surface integral with the frame or fixed thereto having one or more orifices, and a body of filtering material, within which said surface is embedded. Each plate is made by covering the inner surface of a frame on both sides with a pulp of fibrous filtering material and water and condensing the same upon said surface.

Figure 1:
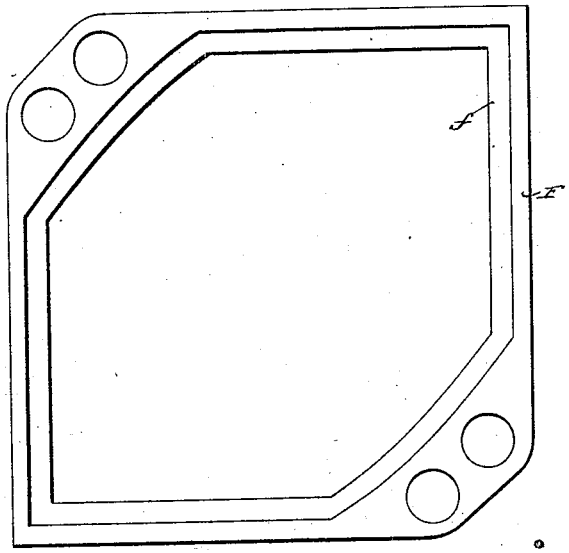
Figure 1A:

The frame represented by Figure 1 is about full size and adapted for use in very small filter-presses, and has but a single large orifice in the aforesaid surface, so that of this surface $f$ only a narrow strip or ridge is left, running in the middle of the frame along its inside and which becomes embedded in the edges of the filtering-body B, Fig. 1$^a$, when the latter is formed in the manner stated.

Figure 2:
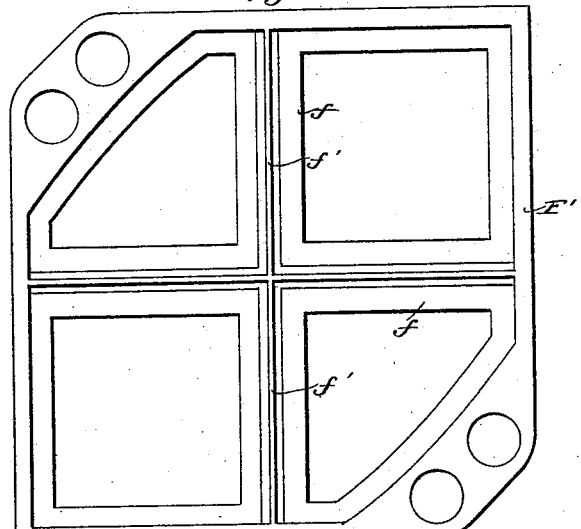
Figure 2A:

The frame F', Figs. 2 and 2$^a$, is divided by cross-bars $f'$ into four compartments having each in the surface $f$ one orifice, leaving narrow strips, as in the frame F.

Frame F$^2$, Figs. 3 and 3$^a$, adapted for very large presses, is of the same character as the foregoing, except that it is divided into a greater number of compartments. In both frames the cross-bars $f'$ will become embedded in the filtering-bodies together with the surface portions $f$.

In the frame F$^3$, Fig. 4, the surface $f^2$ has a plurality of round orifices $b$, so as to form a kind of grating for carrying and sustaining the filtering-body B, Fig. 4$^a$, deposited on both sides thereof and extending through the orifices $b$.

Frame F$^4$, Figs. 5 and 5$^a$, differs from frame F$^3$ only in this that the orifices $b'$ are rectangular.

In frame F$^5$, Figs. 6 and 6$^a$, the board-carrying surface $f^3$ is constituted by a ridge running along the inner side of the frame and a web of coarse wire-gauze attached to the ridge, the meshes of the gauze forming the said orifices.

I claim as my invention—

A filtering plate consisting of a frame having one or more openings therein and ledges on the frame projecting into said openings, and an integral body of filtering material in each of said openings embracing said ledges on both sides of the latter and supported thereby, substantially as specified.

In testimony whereof I have hereunto set my hand in the presence of two subscribing witnesses.

LORENZ ADALBERT ENZINGER.

Witnesses:
JEAN METZGER,
EMIL HOFFMANN.